No. 716,725. Patented Dec. 23, 1902.
F. L. LEE.
CULTIVATOR.
(Application filed June 27, 1902.)

(No Model.) 2 Sheets—Sheet 1.

No. 716,725. Patented Dec. 23, 1902.
F. L. LEE.
CULTIVATOR.
(Application filed June 27, 1902.)
(No Model.) 2 Sheets—Sheet 2.

WITNESSES:

INVENTOR
Frank L. Lee
BY
ATTORNEYS.

UNITED STATES PATENT OFFICE.

FRANK L. LEE, OF FARMINGTON, MICHIGAN.

CULTIVATOR.

SPECIFICATION forming part of Letters Patent No. 716,725, dated December 23, 1902.

Application filed June 27, 1902. Serial No. 113,476. (No model.)

*To all whom it may concern:*

Be it known that I, FRANK L. LEE, a citizen of the United States, and a resident of Farmington, in the county of Oakland and State of Michigan, have invented a new and Improved Cultivator, of which the following is a full, clear, and exact description.

The purpose of the invention is to provide a cultivator especially adapted for the cultivation of beets which is operated by a check-wire—the same, for example, which was employed to operate the device depositing the beet-seed. In this manner the ground between the beets and quite close to the beets is dug up or cultivated and the cultivator blades or hoes are automatically guided at the proper time around the beets, thus preventing the cultivator-hoes from touching or in any manner injuring the beets.

A further purpose of the invention is to provide a cultivator of the type described which will be simple, durable, and light in construction and positive and reliable in operation, the said cultivator being preferably a wheeled cultivator.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
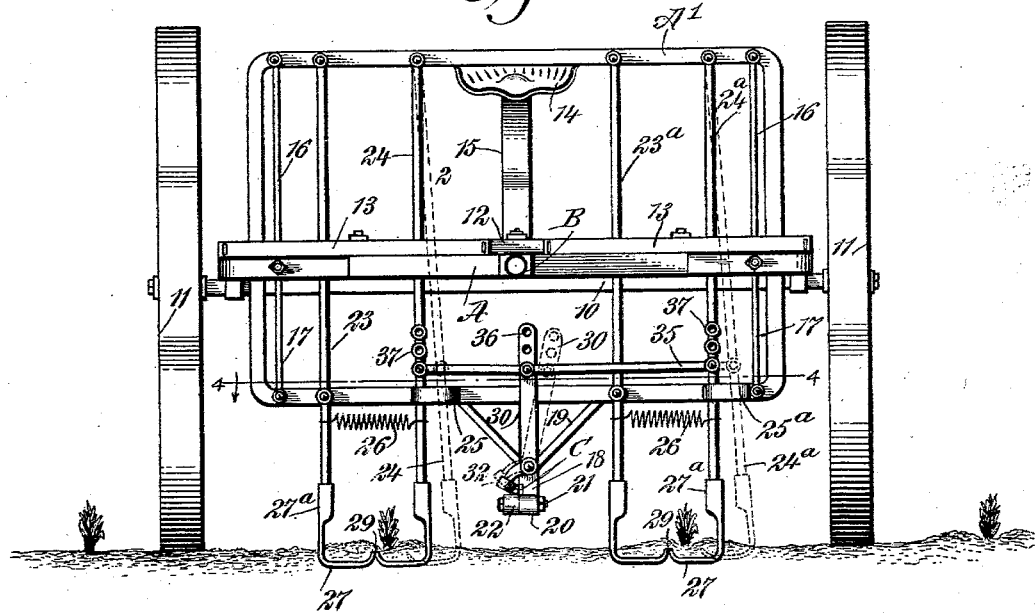
Figure 2:
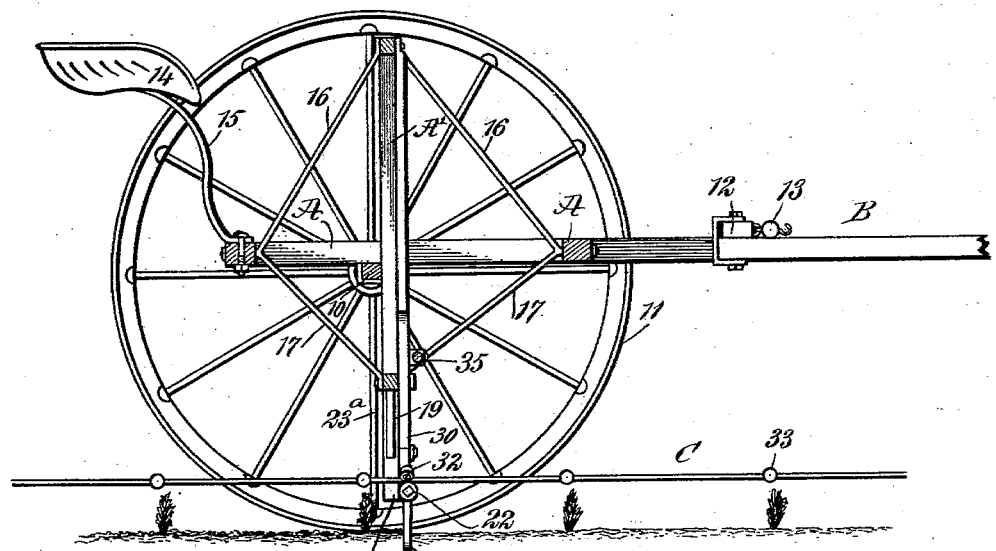
Figure 4:
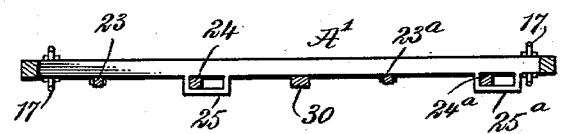

Figure 1 is a rear elevation of the improved cultivator. Fig. 2 is a central vertical section through the cultivator, showing clearly the application of the check-wire thereto for the purpose of operating the cultivator hoes or blades at proper periods. Fig. 3 is an enlarged detail side elevation of the devices which receive the check-wire and which serve to operate the cultivator hoes or blades, and Fig. 4 is a horizontal section taken practically on the line 4 4 of Fig. 1.

A represents a horizontal skeleton frame, to the under portion of which, about centrally between the front and the rear of the frame, an axle 10 is secured in any suitable or approved manner, and supporting-wheels 11 are mounted to turn loosely at the ends of the said axle. A pole B is secured to the central forward portion of the horizontal body-frame A, and the said pole is provided with the usual draft-tree comprising an equalizing-bar 12 and singletrees 13, as is shown in Figs. 1 and 2.

In addition to the horizontal frame A the body of the cultivator consists of a vertical skeleton frame A', and both of said frames A and A' are substantially rectangular. The vertical frame A' is passed through the horizontal frame A, extending above and below it, and the vertical frame is held in position by upper braces 16, attached to the front and rear members of the horizontal frame and to the front and rear surfaces of the upper member of the vertical frame at the ends of said member, and by lower braces 17, attached to the horizontal frame where the upper braces 16 are secured and to the end portions of the lower member of the vertical frame at the front and at the rear, as is shown in Figs. 1 and 2.

A seat 14 is supported by the usual standard 15, which standard is secured to the rear central portion of the horizontal frame A. A post 18 extends downward from the central lower portion of the vertical body-frame A', and braces 19, attached to the frame and to the said post at each of its sides, serve to strengthen the post. At the lower end of the post 18 an eye or a projection 20 is formed, through which a bolt 21 is passed, and at the right-hand end of the said bolt a friction-roller 22 is mounted to turn, the bolt and roller being horizontal.

A vertical arm 23 is secured to the top and bottom members of the vertical body-frame A', extending below the bottom of the said frame, and the said arm 23 is located adjacent to the right-hand end of the frame A'. A similar arm 23ª, likewise attached to the top and bottom of the frame A' and extending below the said frame, is located between the center of the frame A' and its left-hand end. Between the right-hand arm 23 and the center of the vertical frame A' a third arm 24 is pivotally attached to the upper portion of said frame A', passing downward through a loop 25 of suitable length located longitudinally upon the lower member of the vertical body section or frame A', as is shown in Figs. 1 and 4. An arm 24ª, corresponding to the arm 24, is pivotally attached to the upper portion of the vertical body section or frame A' and extends downward through a lower loop 25ª, corresponding to the loop 25, as is shown in Figs. 1 and 4. The said arm 24ª is located between the arm 23ª and the left-hand end of the vertical body section or frame A' of the device. Thus it will be observed that the arms are in pairs, a pair being at each side of the center of the body, and each pair of arms consists of a fixed arm and a pivoted or swinging arm. All of the arms extend downward the same distance below the body-frames, and the arms of each pair are normally held in vertical position and in parallelism with each other by springs 26, attached to the said arms below the vertical body section or frame A', as is shown in Fig. 1. At the lower end of each of the said arms the shank 27ª of a cultivator-blade 27 is secured in any suitable manner. These cultivator-blades 27 are preferably in the form of hoes, as is illustrated in Fig. 1, and lie substantially parallel with the ground, and the hoes or cultivator-blades of each pair of arms extend in direction of each other and their inner or opposing ends 29 are upturned, as is also shown in Fig. 1. These upturned ends of each pair of hoes or cultivator-blades are held in engagement by the aforesaid springs 26.

A lever 30 is fulcrumed at its lower end upon the post 18, near the bottom end of said post, as is shown in Figs. 1 and 3, and at the lower end of the lever 30 a downwardly-curved branch 31 extends from its right-hand edge. This branch 31 of the lever 30 carries a roller 32, which is immediately above the friction-roller 22 on the post and is at an angle thereto. The said friction-roller 32 on the lever partially faces the right-hand edge of the post, and the check-wire C is passed between a wear-plate 34 at the right-hand edge of the post and the two rollers 22 and 32, as is shown in Figs. 1, 2, and 3. This check-wire is provided with the usual balls or projections 33, formed thereon at regular intervals apart.

A connecting-rod 35 is adjustably attached between its ends to the upper end of the lever 30, the upper end of said lever 30 being therefore provided with a series of apertures 36. The ends of the connecting-rod 35 are adjustably attached to the swinging or pivoted arms 24 and 24ª in an adjustable manner, as is shown in Fig. 1, the said arms 24 and 24ª having a series of apertures 37 produced therein for that purpose.

In operation, the beets having been planted with a planter controlled by a check-wire, after the beets have grown sufficiently to be cultivated the same check-wire used in planting is employed in connection with the cultivation of the beets. This wire is stretched in any well-known way between the rows of beets and is properly fastened at its ends. The said wire is then passed between the rollers 22 and 32, as has been described, bringing the pairs of cultivator-blades at two rows of beets to be cultivated, and the points where the inner ends of the pairs of cultivator-blades engage when the machine is in action is preferably at one side of the line of plants, as is shown in Fig. 1. As the machine is drawn forward and while the hoes are being drawn through the earth between the beets the plain portion of the check-wire passes between the said rollers 22 and 32 and the ground is thoroughly dug up between the beet-plants; but as soon as the cultivator-blades approach the beet-plants near enough to be an injury thereto a projection on the check-wire will pass between the rollers 22 and 32 and will force the branch 31 of the lever 30 upward, carrying the lever to the left-hand side of the machine, as is shown in dotted lines in Figs. 1 and 3, thus carrying the pivoted or swinging arms 24 and 24ª in the same direction as is shown in Fig. 1, causing the hoes or cultivator-blades attached to such arms to be carried away from the beets, so as not to injure them. As the machine continues to advance the hoes attached to the pivoted arms are carried around the beets a sufficient distance therefrom to guard against injury, and the hoes or cultivator-blades on the fixed arm being at one side of the beets will be out of range therewith. Consequently the plants are passed without injury to them, although the ground is cultivated close to the plants, and the moment that the plants are passed the plain portion of the check-wire will be again brought between the rollers 22 and 32, and the springs 26 will then instantly act to bring the pivoted arms, and consequently the hoes or cultivator-blades carried thereby, to the normal position for cultivation between succeeding plants.

Having thus described my invention, I claim as new and desire to secure by Letters Patent—

1. In cultivators, cultivator blades or hoes mounted to be moved laterally, and a check-wire for controlling said lateral movement.

2. In cultivators, a swinging support for the blades or hoes, a shifting mechanism for said supports, and a check-wire for actuating the shifting mechanism.

3. In cultivators, a fixed hoe or blade support, an opposing similar support mounted to swing to and from the fixed support, a shifting mechanism for the swinging support, and a check-wire for actuating the shifting mechanism.

4. In cultivators, a wheel-supported frame, hoe-supports for two rows, carried by the frame, one hoe-support for each row being fixed and the other mounted to swing to and from the fixed support, a shifting mechanism common to both swinging hoe-supports, and means for simultaneously moving the swinging hoe-supports in the same direction to and from the fixed hoe-supports.

5. In cultivators, a fixed hoe or blade support, an opposing similar support mounted to swing to and from the fixed support, hoes or blades carried by the said supports, a tension device normally acting to draw the hoes or blades in direction of each other, a shifting device for the swinging support, and a check-wire for operating the shifting device to carry the swinging support from the fixed support, as set forth.

6. In cultivators, a frame, a fixed hoe or blade support secured to the frame, a similar support mounted to swing to and from the fixed support, a spring connecting the two supports, hoes or blades attached to the said supports, extending in direction of each other and arranged to engage at their inner ends in the normal position of the supports, a lever carried by said frame, a connection between the lever and the swinging support, and a check-wire carried in engagement with the said lever to operate the same, as described.

7. In a cultivator, a frame, a hoe or blade support secured to the frame, an opposing similar support mounted to swing on the frame, a tension device connecting the two supports, hoes or blades secured to the said supports, a lever fulcrumed upon the frame, a connection between the lever and the swinging support, an extension from said lever, a friction-roller carried by said extension, a second friction-roller carried by the frame at a point below the pivotal connection of the lever therewith, the friction-roller carried by the frame being adapted to normally engage with the roller carried by the lever, and a check-wire extending in engagement with the two friction-rollers, as set forth.

8. In cultivators, cultivator blades or hoes; swinging supports for said blades or hoes; a shifting mechanism for said supports; a check-wire for actuating said shifting mechanism to cause the hoes or blades to move laterally out of line with the main direction of the furrows.

In testimony whereof I have signed my name to this specification in the presence of two subscribing witnesses.

FRANK L. LEE.

Witnesses:
P. DEAN WARNER,
HENRY W. LEE.